(12) United States Patent
Han et al.

(10) Patent No.: US 11,117,442 B2
(45) Date of Patent: Sep. 14, 2021

(54) AIR CONDITIONING SYSTEM FOR VEHICLE

(71) Applicant: HANON SYSTEMS, Daejeon (KR)

(72) Inventors: Joong Man Han, Daejeon (KR); Doo Hoon Kim, Daejeon (KR); Chul Hee Kim, Daejeon (KR); Hyeon Gyu Kim, Daejeon (KR); Kyung Ju An, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 148 days.

(21) Appl. No.: 15/718,278

(22) Filed: Sep. 28, 2017

(65) Prior Publication Data

US 2018/0099539 A1 Apr. 12, 2018

(30) Foreign Application Priority Data

Oct. 7, 2016 (KR) .................. 10-2016-0129728

(51) Int. Cl.
*B60H 3/06* (2006.01)
*B60H 1/00* (2006.01)

(52) U.S. Cl.
CPC ....... *B60H 1/00535* (2013.01); *B60H 3/0608* (2013.01); *B60H 1/0055* (2013.01); *B60H 1/00849* (2013.01); *B60H 2001/006* (2013.01); *B60H 2001/00214* (2013.01)

(58) Field of Classification Search
CPC .. B60H 1/00535; B60H 3/0608; B60H 1/055; B60H 1/00849; B60H 2001/00214; B60H 2001/006

USPC ......................................................... 454/158
See application file for complete search history.

(56) References Cited

U.S. PATENT DOCUMENTS

| | | | | |
|---|---|---|---|---|
| 2,780,077 A | * | 2/1957 | Jacobs | B60H 1/00007 165/43 |
| 3,263,739 A | * | 8/1966 | Gaskill | B60H 1/00835 165/202 |
| 4,289,195 A | * | 9/1981 | Bellot | B60H 1/00064 165/204 |
| 5,478,274 A | * | 12/1995 | Danieau | B60H 1/00064 165/43 |
| 8,002,615 B2 | * | 8/2011 | Jeong | B60H 1/00849 454/139 |

* cited by examiner

*Primary Examiner* — Helena Kosanovic
(74) *Attorney, Agent, or Firm* — Dickinson Wright PLLC (57) ABSTRACT

Disclosed herein is an air conditioning system for a vehicle, in which an air conditioning unit having noise inducing unit is arranged at an engine room based on a dash panel and a distribution duct for distributing air to the interior of the vehicle is arranged in the interior of the vehicle based on the dash panel, thereby reducing noise and vibration in the interior of the vehicle, securing visibility and enabling a worker to easily access the air conditioning system for follow-up service because the air conditioning unit causing noise is arranged inside the engine room, and enhancing passengers' convenience by maximizing the interior space of the vehicle in comparison with the conventional air conditioning systems because only the distribution duct is arranged in the interior of the vehicle.

20 Claims, 11 Drawing Sheets

FIG. 1

PRIOR ART

FIG. 2

PRIOR ART

AIR CONDITIONING SYSTEM FOR VEHICLE

CROSS-REFERENCE TO RELATED APPLICATIONS

This application claims the benefit and priority of KR 10-2016-0129728, filed Oct. 7, 2016. The entire disclosure of the above application is incorporated herein by reference.

BACKGROUND OF THE INVENTION

Field of the Invention

The present invention relates to an air conditioning system for a vehicle, and more particularly, to an air conditioning system for a vehicle, in which an air conditioning unit having noise inducing unit is arranged at an engine room based on a dash panel and a distribution duct for distributing air to the interior of the vehicle is arranged in the interior of the vehicle based on the dash panel.

Background Art

Figure 1:
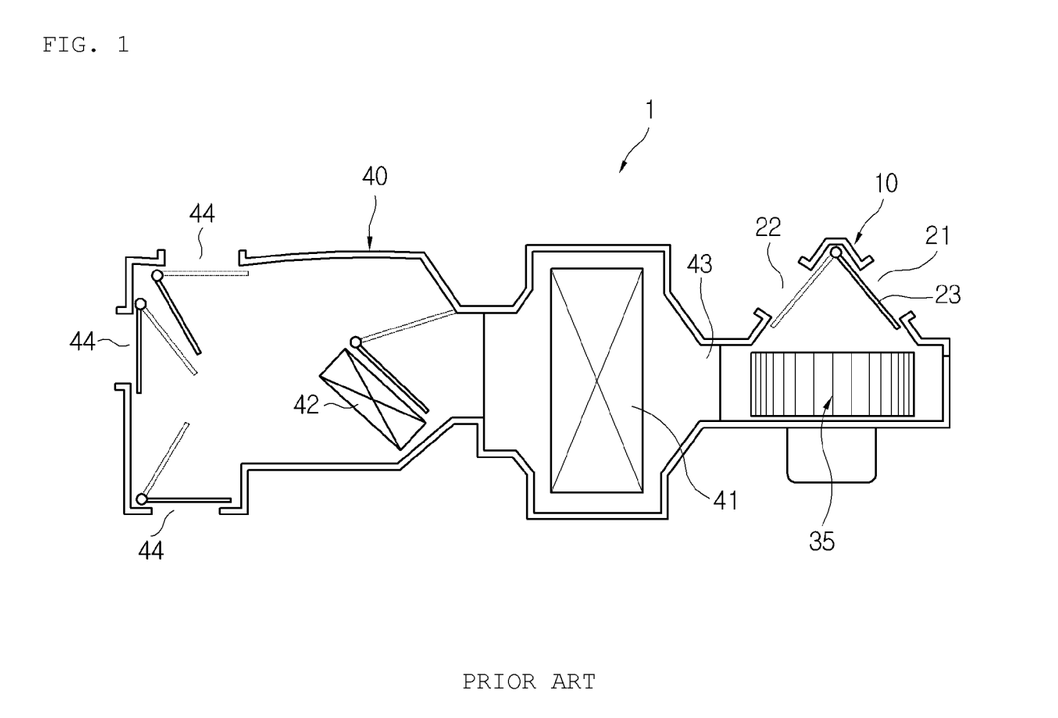
FIG. 1 is a schematic view showing a conventional air conditioning system for a vehicle.

In general, an air conditioning system for a vehicle is a system, which induces indoor air and outdoor air of the vehicle, heats or cools the air and blows the heated or cooled air to the interior of the vehicle so as to heat or cool the interior of the vehicle. As shown in FIG. 1, the air conditioning system for the vehicle includes: a blower unit 10 having an indoor air inlet 21 and an outdoor air inlet 22 formed at one side thereof, an indoor and outdoor air converting door 23 for selectively opening and closing the indoor air inlet 21 and the outdoor air inlet 22, and a blast fan 35 for forcedly blowing the indoor air or the outdoor air to an inlet 43 of an air-conditioning case 40; and the air-conditioning case 40 having the inlet 43, to which the air blown from the blower unit 10, an outlet 44 for discharging the air to the outside, and an evaporator 41 and a heater core 42 mounted inside the air-conditioning case 40 sequentially to be spaced apart from each other at a predetermined interval.

Figure 2:
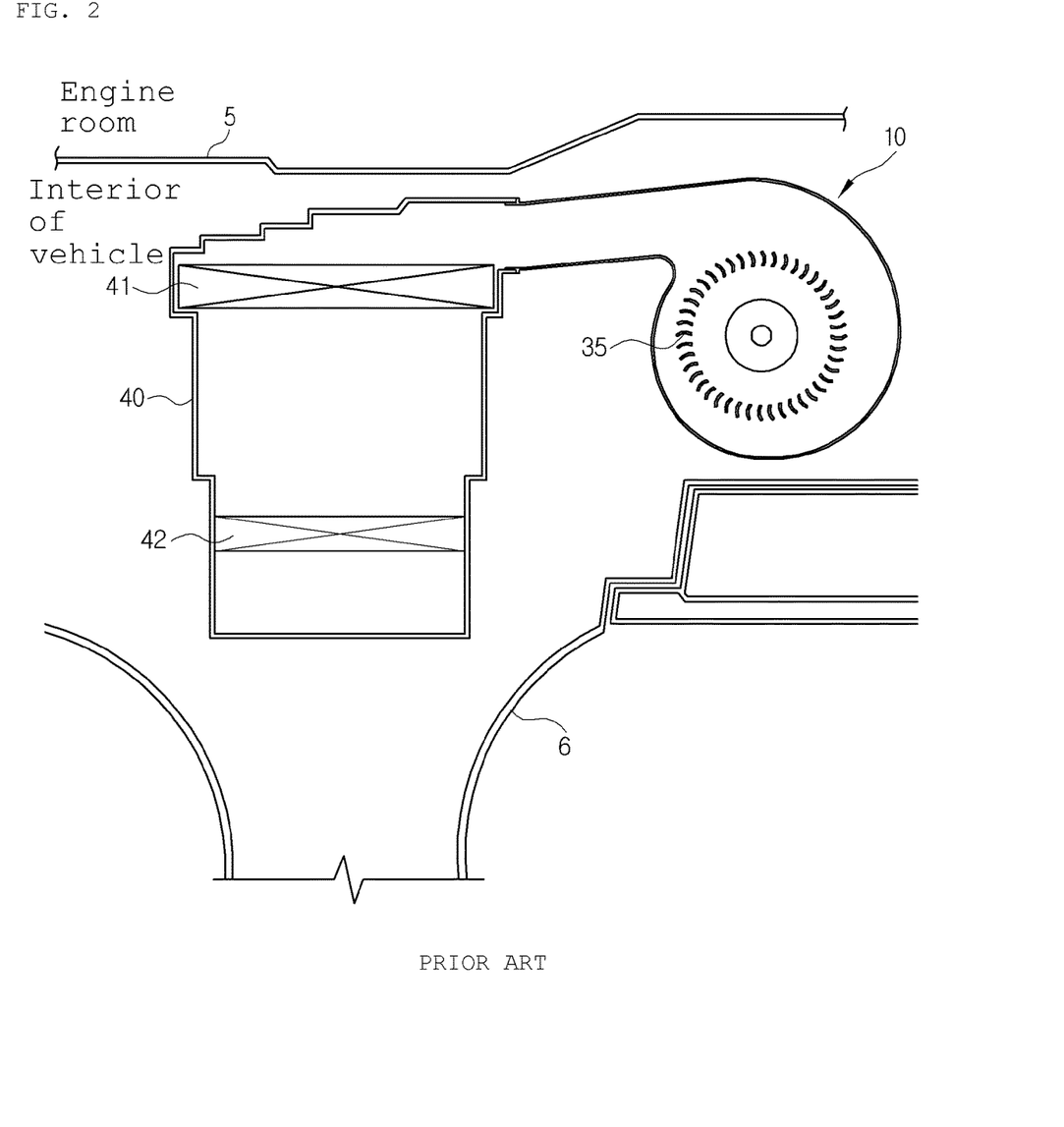
FIG. 2 is a view showing a state where a conventional air conditioning system is installed in a vehicle.
Figure 3:
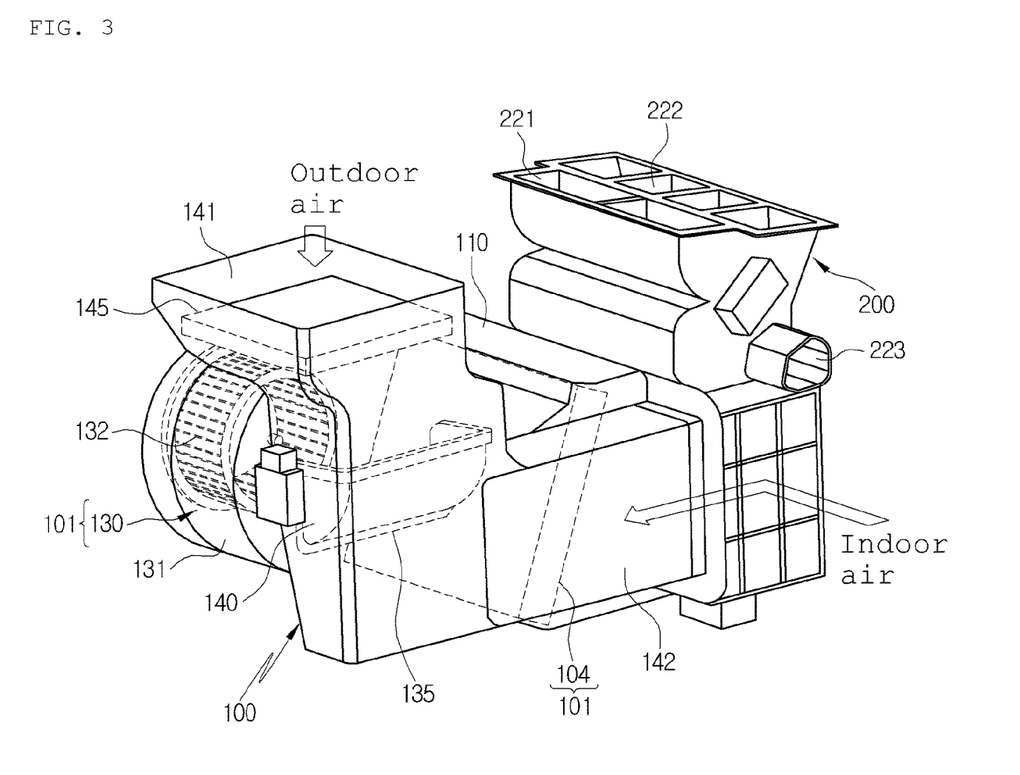
FIG. 3 is a perspective view showing an air conditioning system for a vehicle according to a first preferred embodiment of the present invention.
Figure 4:
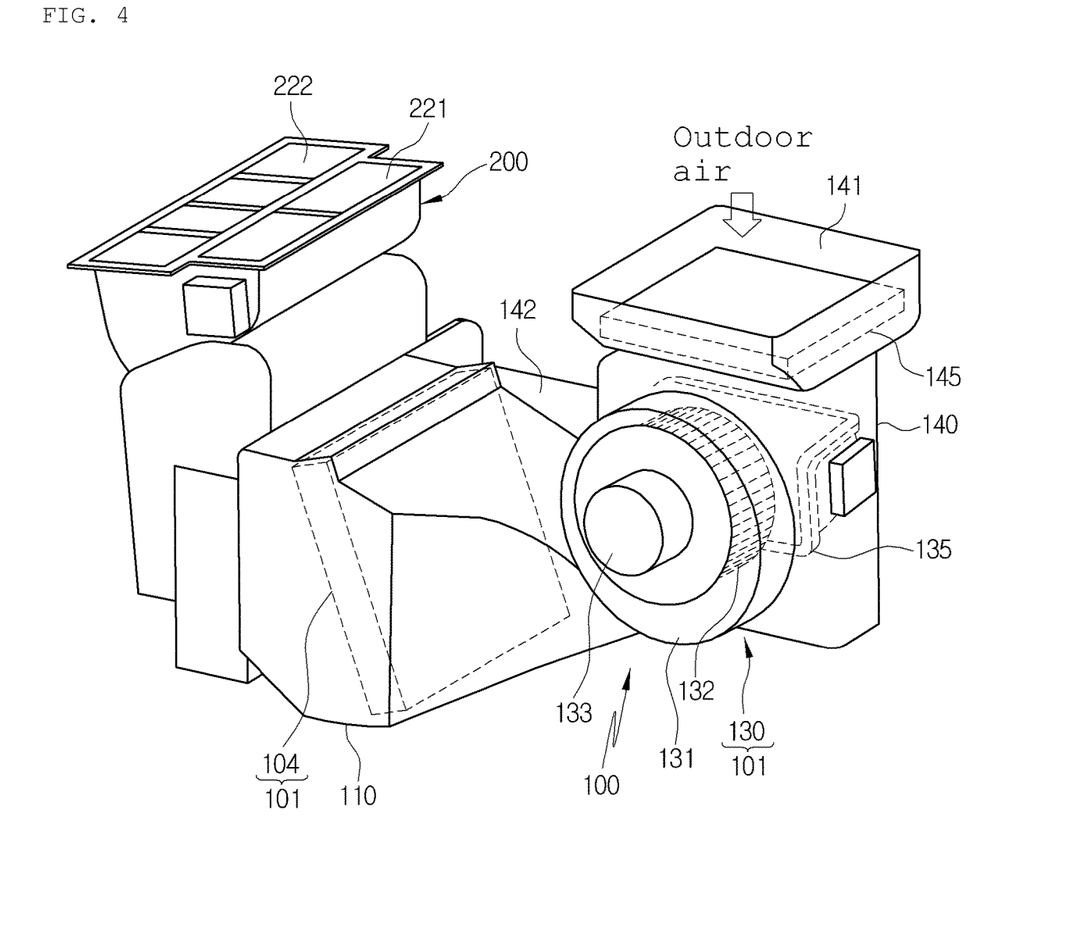
FIG. 4 is a perspective view of the air conditioning system of FIG. 3 seen from a different direction.
Figure 5:
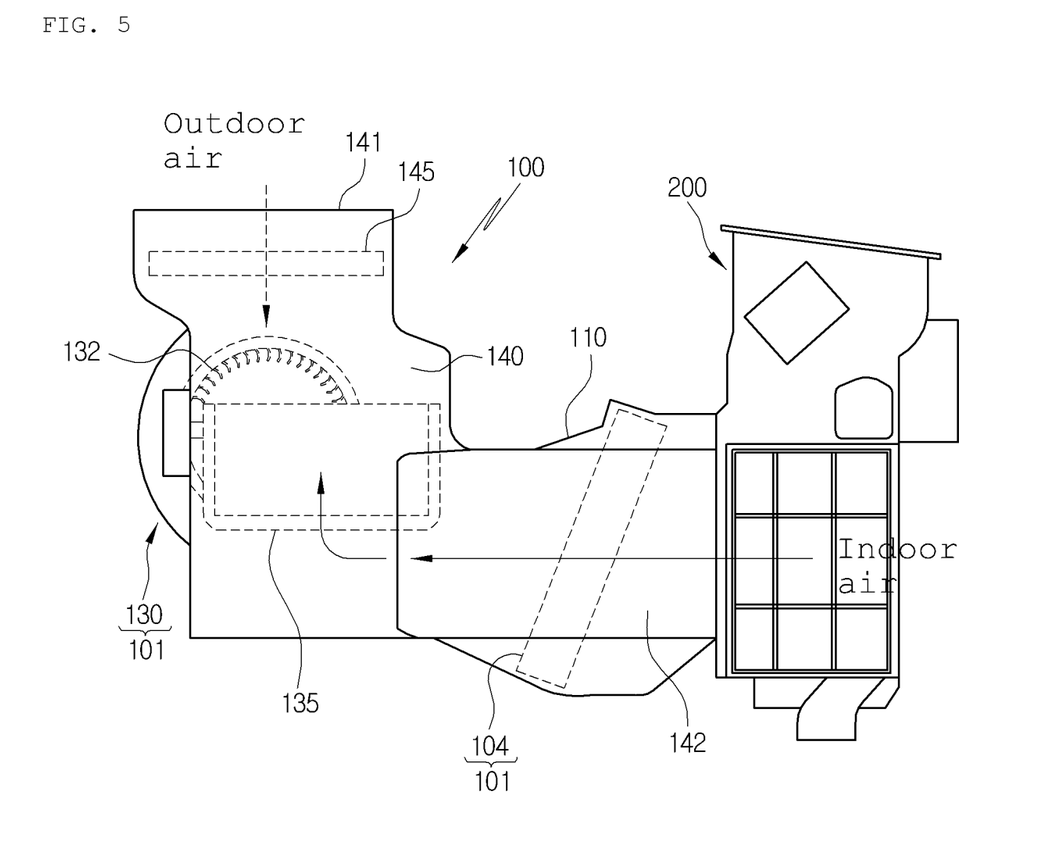
FIG. 5 is a side view of the air conditioning system of FIG. 3.
Figure 6:
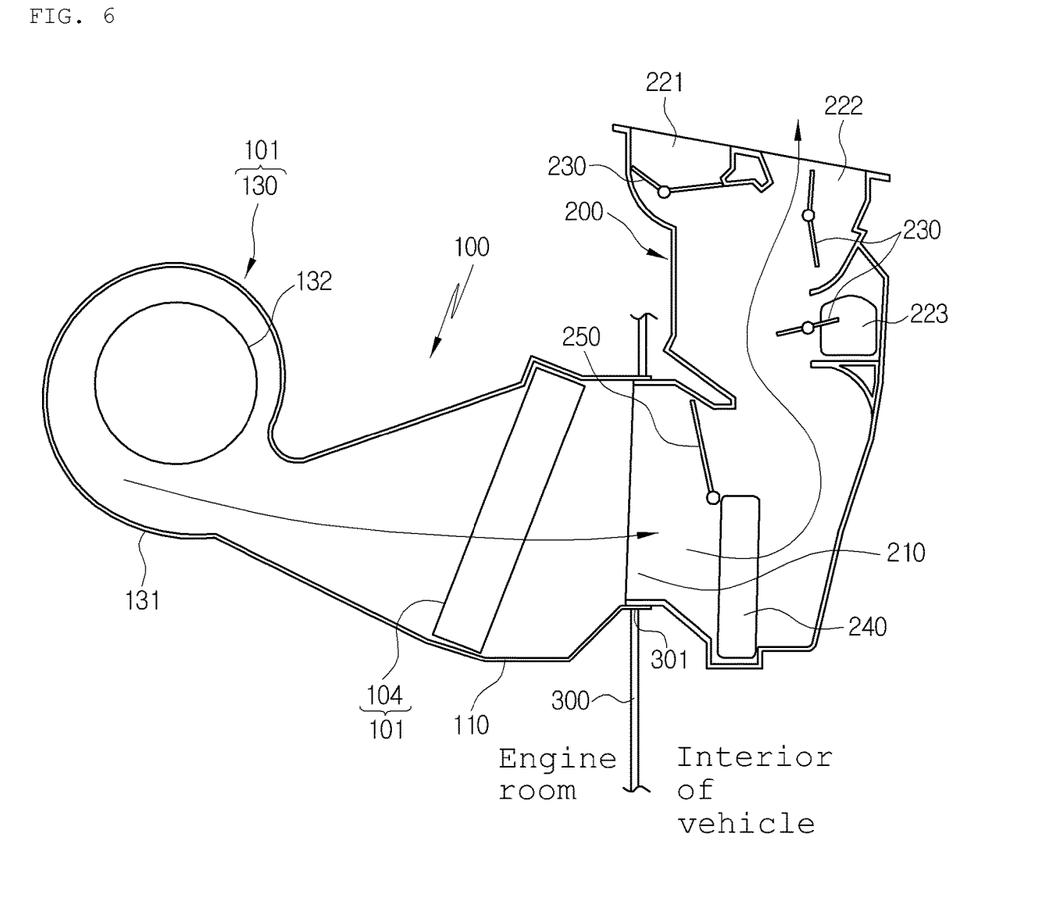
FIG. 6 is a sectional view of the air conditioning system for a vehicle according to the first preferred embodiment of the present invention.

FIG. 2 illustrates a state where an air conditioning system for a vehicle is installed in a vehicle. In FIG. 2, the air conditioning system is a semi-center mounting type air conditioning system.

Referring to FIG. 2, the air conditioning system includes an air-conditioning case 40 in which an evaporator 41 and a heater core 42 are mounted, and a blower unit 10 which is connected to one side of the air-conditioning case 40 and has a blower 35 for blowing air to the air-conditioning case 40.

Such a conventional air conditioning system is arranged in the interior of the vehicle based on a dash panel 5 for partitioning an engine room from the interior of the vehicle. In this instance, the air-conditioning case 40 is arranged in the middle of the interior of the vehicle, and the blower unit 10 is arranged at the passenger's seat inside the vehicle.

Moreover, the air conditioning system is arranged inside an instrument panel 6 in the interior of the vehicle.

However, because the conventional air conditioning system is installed in the interior of the vehicle based on the dash panel 5, namely, because the blower unit 10 causing noise and vibration and the evaporator 41 and an expansion valve (not shown) causing refrigerant flowing sound are arranged in the interior of the vehicle, it causes an increase of noise and vibration in the interior of the vehicle.

Furthermore, because the air conditioning system which is arranged in the interior of the vehicle occupies a lot of space in the interior of the vehicle, it is difficult to secure a space inside the vehicle, it deteriorates passengers' convenience, such as foot rest, storage of a stroller, installation of a small-sized refrigerator, and it is difficult to easily access the air conditioning system for follow-up service due to a low visibility.

SUMMARY OF THE INVENTION

Accordingly, the present invention has been made in view of the above-mentioned problems occurring in the prior art, and it is an object of the present invention to provide an air conditioning system for a vehicle, in which an air conditioning unit having noise inducing unit is arranged at an engine room based on a dash panel and a distribution duct for distributing air to the interior of the vehicle is arranged in the interior of the vehicle based on the dash panel, thereby reducing noise and vibration in the interior of the vehicle, securing visibility and enabling a worker to easily access the air conditioning system for follow-up service because the air conditioning unit causing noise is arranged inside the engine room, and enhancing passengers' convenience by maximizing the interior space of the vehicle in comparison with the conventional air conditioning systems because only the distribution duct is arranged in the interior of the vehicle.

To accomplish the above object, according to the present invention, there is provided an air conditioning system for a vehicle including: an air conditioning unit having noise inducing unit; and a distribution unit for distributing air discharged from the air conditioning unit to a specific position in the interior of the vehicle, wherein the air conditioning unit is arranged in an engine room based on a dash panel, which partitions the engine room from the interior of the vehicle, and the distribution unit is arranged in the interior of the vehicle.

As described above, according to a preferred embodiment of the present invention, because the air conditioning unit having the noise inducing unit is arranged at the engine room based on the dash panel and the distribution duct for distributing air to the interior of the vehicle is arranged in the interior of the vehicle based on the dash panel, the air conditioning system for the vehicle according to the preferred embodiment of the present invention can reduce noise and vibration in the interior of the vehicle.

Moreover, because the air conditioning unit is arranged inside the engine room, the air conditioning system for the vehicle according to the preferred embodiment of the present invention secures visibility, enables a worker to easily access the air conditioning system for follow-up service, and promotes drain of condensate water of the evaporator.

Furthermore, because only the distribution duct is arranged in the interior of the vehicle, the air conditioning system for the vehicle according to the preferred embodiment of the present invention can enhance passengers' convenience, such as foot rest, storage of a stroller, installation of a small-sized refrigerator, by maximizing the interior space of the vehicle in comparison with the conventional air conditioning systems.

Additionally, the air conditioning system for the vehicle according to the preferred embodiment of the present invention can promote mass production of air conditioning units through various embodiments according to structures for inhaling outdoor air and indoor air of vehicles.

Moreover, the air conditioning system for the vehicle according to the preferred embodiment of the present invention may have various structures and efficiently utilize the engine room space according to a structure of an intake duct and a mounting position of a filter.

Furthermore, the air conditioning system for the vehicle according to the preferred embodiment of the present invention can minimize sizes of the penetration part and the auxiliary penetration part, which are formed to be adjacent to the dash panel, because the indoor air inflow duct is arranged on the side or the upper part of the air conditioning unit.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

As shown in the drawings, an air conditioning system for a vehicle according to the present invention includes an air conditioning unit 100 having noise inducing unit 101 and a distribution unit 200 for distributing air discharged from the air conditioning unit 100 to a specific position in the interior of the vehicle.

The air conditioning unit 100 includes an air-conditioning case 110 in which a heat exchanger for cooling 104 is embedded, and a blower unit 130 for blowing air to the air-conditioning case 110.

Here, the noise inducing unit 101 may be the blower unit 130 for inhaling and blowing indoor air and outdoor air to the air-conditioning case 110 of the air conditioning unit 100 and components which cause phase change of refrigerant.

The components causing phase change of refrigerant may be the heat exchanger for cooling 104, which is mounted in an air passageway inside the air-conditioning case 110 of the air conditioning unit 100 to evaporate the refrigerant, and an expansion valve (not shown), which is mounted at the front end of the heat exchanger for cooling 104 to expand refrigerant heading for the heat exchanger for cooling 104.

Preferably, the heat exchanger for cooling 104 is an evaporator.

In the case of the blower unit 130, noise is generated from the blower 132 and a motor 133. Moreover, in the case of the heat exchanger for cooling, namely, the evaporator and the expansion valve, noise is generated due to refrigerant flowing sound and vibration generated during the phase change process of the refrigerant.

The distribution unit 200 is connected with an outlet of the air-conditioning case 110 of the air conditioning unit 100 in order to distribute the air discharged from the air conditioning unit 100 to a specific position of the interior of the vehicle according to air discharge modes.

Moreover, the air conditioning unit 100 and the distribution unit 200 are dividedly arranged based on a dash panel 300, which partitions an engine room from the interior of the vehicle.

That is, the air conditioning unit 100 is arranged in the engine room based on the dash panel 300, and the distribution unit 200 is arranged in the interior of the vehicle based on the dash panel 300.

As described above, the air conditioning unit 100 having the noise inducing unit 101, which are the blower unit 130 and the components causing phase change of refrigerant, such as the evaporator and the expansion valve, is arranged in the engine room based on the dash panel 300, and the distribution unit 200 for distributing air to the interior of the vehicle is arranged in the interior of the vehicle based on the dash panel 300, so that the air conditioning system can reduce noise and vibration in the interior of the vehicle, be positively utilized in a space where there is no engine in the case of electric vehicles, secure visibility, enable a worker to easily access the air conditioning system for follow-up service because the air conditioning unit 100 causing noise is arranged in the engine room, and can enhance passengers' convenience, such as foot rest, storage of a stroller, installation of a small-sized refrigerator, by maximizing the interior space of the vehicle in comparison with the conventional air conditioning systems because only the distribution duct is arranged in the interior of the vehicle.

Furthermore, the dash panel 300 includes a penetration part 301.

Therefore, the air conditioning unit 100 arranged in the engine room and the distribution unit 200 arranged in the interior of the vehicle are combined with each other through the penetration part 301. Namely, the air conditioning unit 100 and the distribution unit 200 are combined and connected with each other at the penetration part 301.

In other words, the outlet of the air-conditioning case 110 of the air conditioning unit 100 and an air inlet 210 of the distribution unit 200, which penetrate through the penetration part 301 of the dash panel 300, are combined with each other.

Additionally, an indoor air inflow duct 142 which connects the blower unit 130 with the interior of the vehicle is mounted on the outer surface of the air conditioning unit 100.

That is, the indoor air inflow duct 142 is mounted in order to supply indoor air of the interior of the vehicle to the air conditioning unit 100 arranged in the engine room.

An inlet of the indoor air inflow duct 142 is arranged at the dash panel 300 and an outlet of the indoor air inflow duct 142 is connected with the blower unit 130. In more detail, the outlet of the indoor air inflow duct 142 is connected with the blower unit 130 through an intake duct 140, which will be described later.

In the meantime, the dash panel 300 has not only the penetration part 301 communicating with the outlet of the air-conditioning case 110 of the air conditioning unit 100 but also an auxiliary penetration part 302 communicating with the inlet of the indoor air inflow duct 142.

The auxiliary penetration part 302 is formed to make the interior of the vehicle communicate with the indoor air inflow duct 142.

The penetration part 301 and the auxiliary penetration part 302 of the dash panel 300 may be formed into one or may be formed separately.

Moreover, the indoor air inflow duct 142 may be arranged on the side of the air conditioning unit 100, and in this instance, may be arranged on the left side or the right side of the air conditioning unit 100.

Furthermore, the blower unit 130 is arranged at right angles to the indoor air inflow duct 142.

That is, a rotary axis of the blower 132 of the blower unit 130 is arranged at right angles to the indoor air inflow duct 142.

In other words, the indoor air inflow duct 142 and the blower unit 130 are arranged in the width direction of the vehicle.

Additionally, the blower unit 130 is mounted at the inlet of the air conditioning unit 100, and includes: a scroll case 131 in which the blower 132 arranged at right angles to the indoor air inflow duct 142 is mounted; an intake duct 140, which is arranged at one side of the scroll case 131 to communicate with the scroll case 131, and, whose one side has an outdoor air inlet 141 and the other side is connected with the indoor air inflow duct 142; and an indoor and outdoor air converting door 135 mounted inside the intake duct 140 to selectively induce indoor air and outdoor air toward the scroll case 131.

The scroll case 131 is connected with the inlet of the air-conditioning case 110 of the air conditioning unit 100.

Moreover, the outdoor air inlet 141 is formed on an upper part of the intake duct 140, and the indoor air inflow duct 142 is connected to a lower part of the intake duct 140.

In the meantime, the intake duct 140 connects the indoor air inflow duct 142 with the scroll case 131.

The indoor and outdoor air converting door 135 is a dome-shaped door, and is arranged in an axial direction of the blower 132 inside the intake duct 140.

Meanwhile, the indoor and outdoor air converting door 135 is arranged at right angles to the rotary axis of the blower 132. That is, if the rotary axis of the blower 132 is arranged in the width direction of the vehicle, the indoor and outdoor air converting door 135 is arranged in the back-and-forth direction of the vehicle.

Furthermore, in an indoor and outdoor air inflow mode, the indoor and outdoor air converting door 135 can selectively supply indoor air or outdoor air to the scroll case 131.

That is, in the outdoor air inflow mode, because the indoor and outdoor air converting door 135 opens the outdoor air inlet 141, outdoor air is inhaled through the outdoor air inlet 141 when the blower 132 is operated, and the inhaled outdoor air flows toward the inside of the blower 132, and then, is discharged in the radial direction of the blower 132. After that, the outdoor air flows along the inside of the scroll case 131, and then, is blown to the air-conditioning case 110.

In the indoor air inflow mode, because the indoor and outdoor air converting door 135 opens the indoor air inflow duct 142, indoor air is inhaled to the interior of the vehicle through the indoor air inflow duct 142, and the inhaled indoor air is flown to the inside of the blower 132, and then, is discharged in the radial direction of the blower 132. After that, the indoor air flows along the inside of the scroll case 131, and then, is blown to the air-conditioning case 110.

Meanwhile, a motor 133 for rotating the blower 132 is mounted at one side of the blower 132 in the scroll case 131.

Additionally, a filter 145 for removing foreign matters contained in the outdoor air is mounted at the outdoor air inlet 141.

In addition, another filter (not shown) for removing foreign matters contained in the indoor air is mounted at the inlet of the indoor air inflow duct 142.

Therefore, the air conditioning system according to the present invention can make air quality pleasant by removing the foreign matters contained in the outdoor air or the indoor air through the filter 145.

Moreover, the distribution unit 200 includes: an air inlet 210 connected with the outlet of the air-conditioning case 110 of the air conditioning unit 100; a plurality of air outlets for distributing the air induced into the air inlet 210 to specific positions in the interior of the vehicle; and mode doors 230 for adjusting the degree of opening of the air outlets.

The air outlets are a defrost vent 221 and a face vent 222, which are formed dividedly at an upper part of the distribution unit 200, and a floor vent 223, which are formed at the side of the distribution unit 200.

The defrost vent 221 discharges air toward the front window in the interior of the vehicle, the face vent 222 discharges air toward the face of a passenger, who is sitting on the front seat of the vehicle, and the floor vent 223 discharges air toward the passenger's feet in the interior of the vehicle.

Moreover, the mode doors 230 are respectively mounted at the defrost vent 221, the face vent 222 and the floor vent 223 to adjust the degree of opening of the vents according to the air discharge modes.

Furthermore, a heat exchanger for heating 240 is mounted inside the distribution unit 200 in the interior of the vehicle.

The heat exchanger for heating 240 may be a heater core using engine coolant or an electric heater using electric power.

Additionally, a temperature adjusting door 250 is mounted at the front side of the heat exchanger for heating 240 to control temperature by adjusting a mixed amount of warm air passing through the heat exchanger for heating 240 and cold air bypassing the heat exchanger for heating 240.

In the meantime, in the case that the electric heater is mounted, the temperature adjusting door 250 may be omitted, and the electric heater may control temperature just by adjusting its heat value.

In addition, in the first preferred embodiment, the blower unit 130, the air conditioning unit 100 and the distribution unit 200 are arranged in the back-and-forth direction of the vehicle in order.

Figure 7:
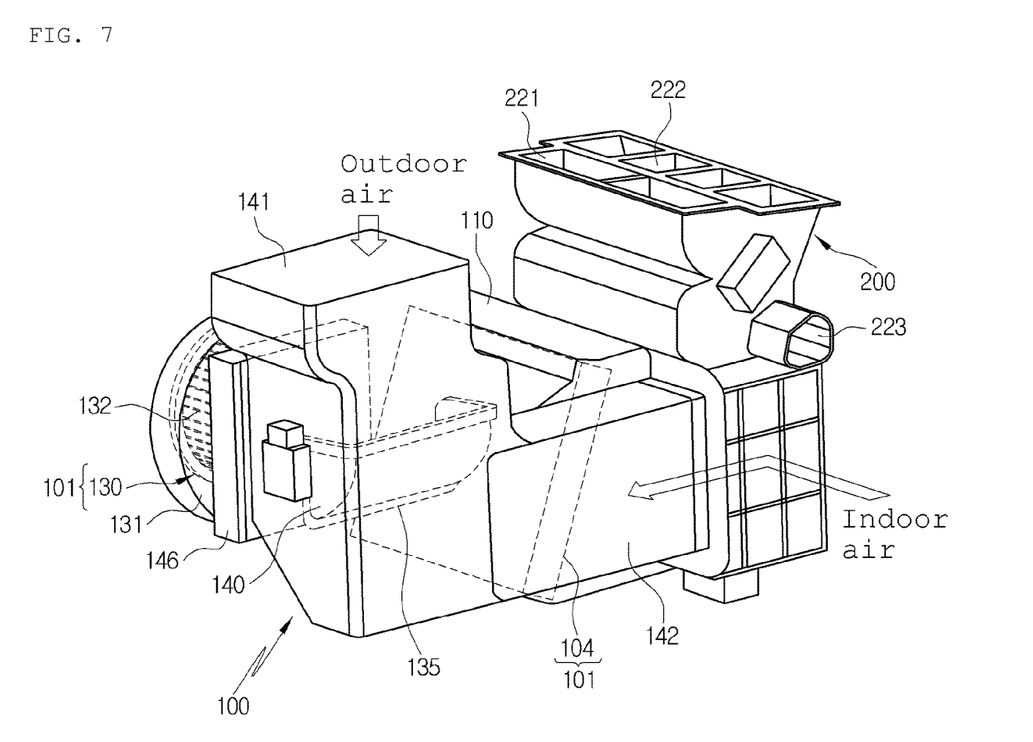
FIG. 7 is a perspective view of an air conditioning system for a vehicle according to a second preferred embodiment of the present invention.

FIG. 7 is a perspective view of an air conditioning system for a vehicle according to a second preferred embodiment of the present invention, and only different parts from the first preferred embodiment will be described.

Compared with the air conditioning system according to the first preferred embodiment, the air conditioning system according to the second preferred embodiment has one filter 146.

That is, the filter 146 of the second preferred embodiment is mounted between the blower 132 and the indoor and outdoor air converting door 135.

In other words, the filter 146 is mounted downstream from the indoor and outdoor converting door 135, and all of foreign matters contained in the indoor air and the outdoor air may be removed by just one filter 146.

That is, in the outdoor air inflow mode, the outdoor air inhaled into the outdoor air inlet 141 passes through the filter 146, and then, is induced into the scroll case 131. In the indoor air inflow mode, the indoor air inhaled into the indoor air inflow duct 142 passes through the filter 146, and then, is induced into the scroll case 131.

As described in the first and second preferred embodiments, the air conditioning system may have various structures according to the structure of the intake duct 140 and the mounting positions of the filters 145 and 146, and may effectively utilize the space of the engine room.

Figure 8:
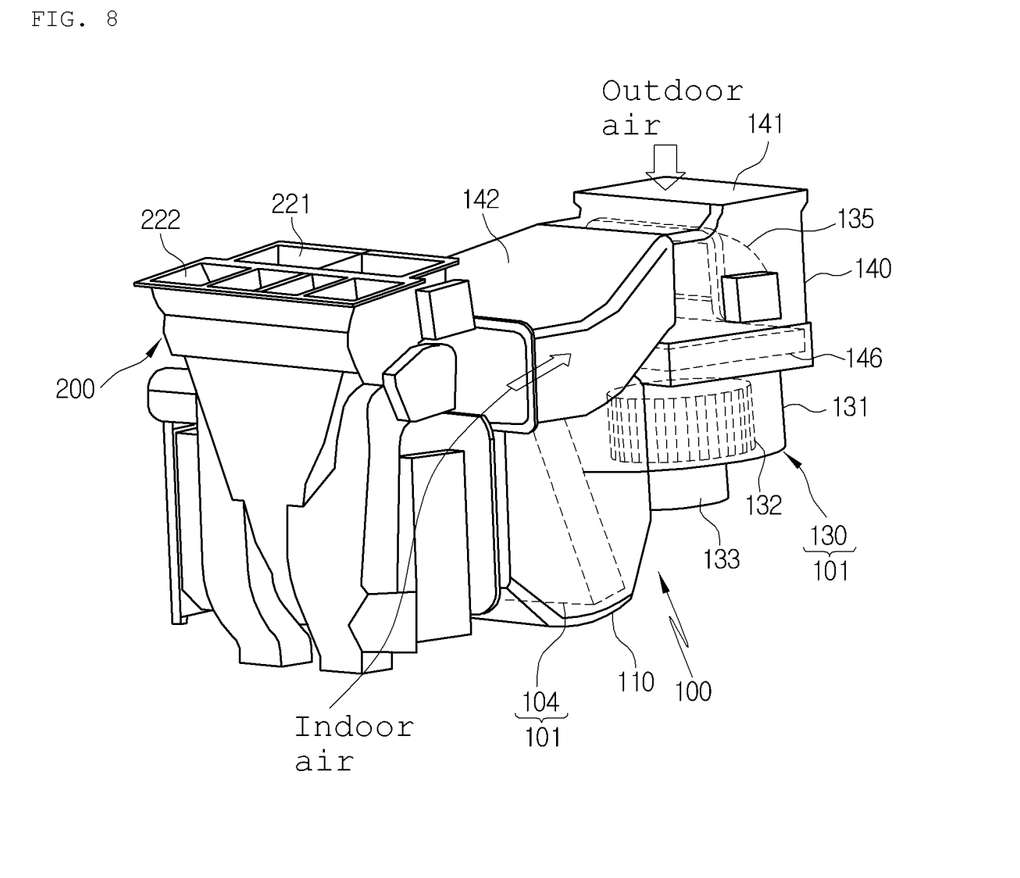
FIG. 8 is a perspective view of an air conditioning system for a vehicle according to a third preferred embodiment of the present invention.
Figure 9:
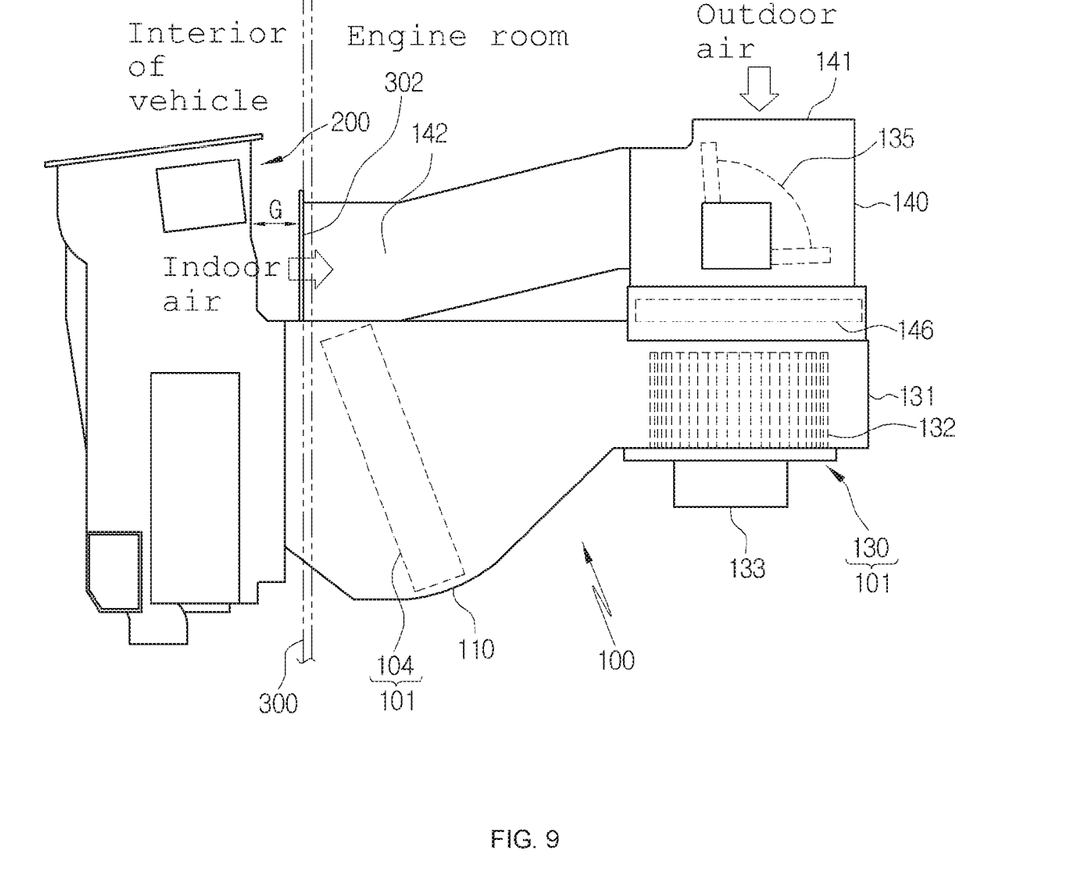
FIG. 9 is a side view of the air conditioning system of FIG. 8.

FIG. 8 is a perspective view of an air conditioning system for a vehicle according to a third preferred embodiment of the present invention, and FIG. 9 is a side view of the air conditioning system of FIG. 8. Referring to FIGS. 8 and 9, only different parts from the first preferred embodiment will be described.

In the third preferred embodiment, the indoor air inflow duct 142 is arranged on the upper part of the air conditioning unit 100, namely, in a dead zone between the distribution unit 200 and the blower unit 130.

In more detail, the indoor air inflow duct 142 is arranged in the dead zone between the distribution unit 200 and the intake duct 140, on the upper part of the air-conditioning case 110 of the air conditioning unit 100.

In other words, in the third preferred embodiment, because the intake duct 140 is arranged on the upper part of the blower unit 130, the dead zone is inevitably formed between the upper part of the distribution unit 200 and the intake duct 140, and the indoor air inflow duct 142 is arranged in the dead zone, such that it is advantageous for packaging.

Moreover, the indoor air inflow duct 142 is supported by the air-conditioning case 110 of the air conditioning unit 100.

As shown in FIG. 9, the indoor air inflow duct 142 is seated and supported on the upper surface of the air-conditioning case 110.

Furthermore, a gap G of a predetermined distance is formed between the indoor air inflow duct 142 and the distribution unit 200. So, the indoor air of the interior of the vehicle can be induced into the indoor air inflow duct 142 by the gap G.

Additionally, the blower unit 130 is arranged at right angles to the indoor air inflow duct 142.

That is, the rotary axis of the blower 132 of the blower unit is arranged at right angles to the indoor air inflow duct 142.

As described in the third preferred embodiment, when the indoor air inflow duct 142 is arranged on the upper part of the air conditioning unit 100, the indoor air inflow duct 142 and the blower unit 130 are arranged in a vertical direction.

Moreover, because the blower unit 130 of the third preferred embodiment is different from that of the first preferred embodiment in the mounting direction but is the same as the first preferred embodiment, the detail structure of the blower unit 130 will be omitted.

Furthermore, the intake duct 140 is arranged on the scroll case 131 of the blower unit 130 to connect the indoor air inflow duct 142 with the scroll case 131.

Additionally, the outdoor air inlet 141 is formed at the upper part of the intake duct 140, and the indoor air inflow duct 142 is connected to the side of the intake duct 140.

The indoor and outdoor air converting door 135 is a dome-shaped door, and is arranged in the axial direction of the blower 132 inside the intake duct 140.

In the meantime, the indoor and outdoor air converting door 135 is arranged at right angles to the rotary axis of the blower 132, namely, is arranged in the width direction of the vehicle as shown in the drawings.

Therefore, in the indoor and outdoor air inflow mode, the indoor air or the outdoor air may be selectively supplied to the scroll case 131 by operation of the indoor and outdoor air converting door 135.

Meanwhile, a motor 133 for rotating the blower 132 is mounted below the blower 132 in the scroll case 131.

In addition, a filter 146 for removing foreign matters contained in the indoor air and the outdoor air is mounted between the blower 132 and the indoor and outdoor air converting door 135.

Moreover, because the indoor air inflow duct 142 is arranged on the upper part of the air-conditioning case 110, the auxiliary penetration part 302 of the dash panel 300 is also formed at a position corresponding with the indoor air inflow duct 142.

As described above, because the indoor air inflow duct 142 may be arranged not only the side but also the upper part of the air conditioning unit 100, the penetration part 301 and the auxiliary penetration part 302 which are formed adjacent to the dash panel 300 may be minimized in their sizes. That is, an outlet of a communication path of the air conditioning unit 100 and an inlet of the indoor air inflow duct 142 are arranged to be adjacent to each other.

Figure 10:
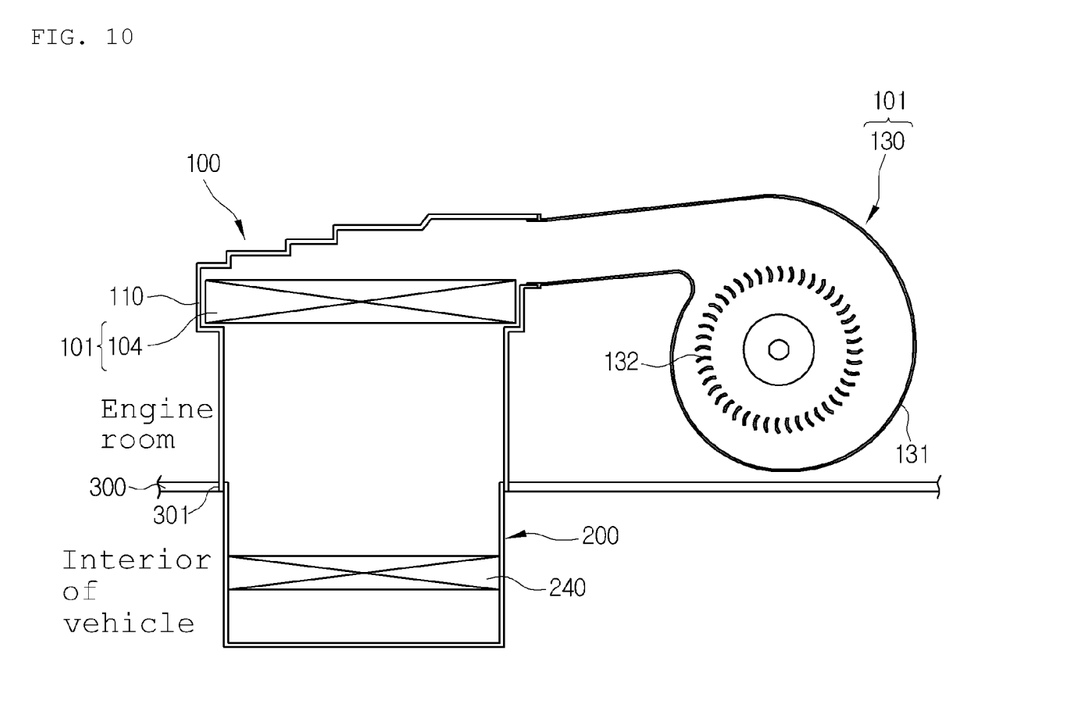
FIG. 10 is a plan sectional view of an air conditioning system for a vehicle according to a fourth preferred embodiment of the present invention.
Figure 11:
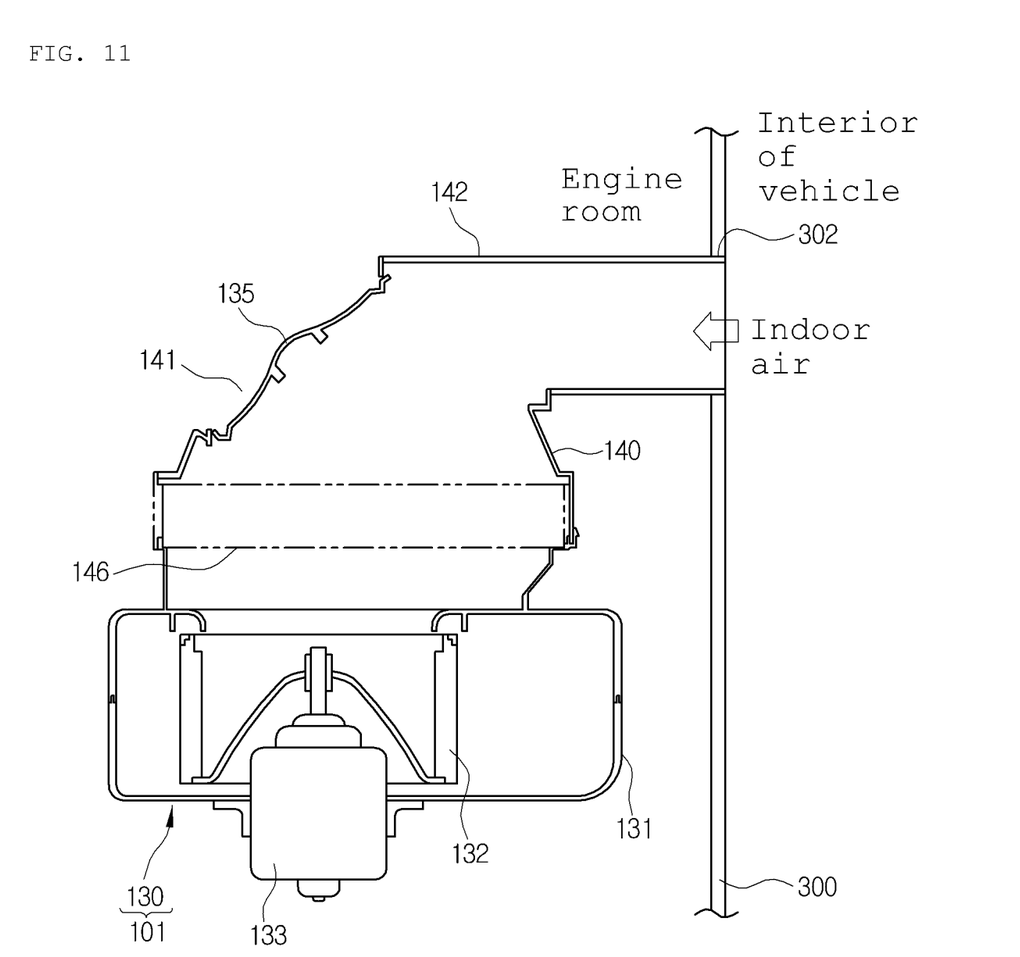
FIG. 11 is a sectional view of a blower unit of the air conditioning system for the vehicle of FIG. 10.

FIG. 10 is a plan sectional view of an air conditioning system for a vehicle according to a fourth preferred embodiment of the present invention, and FIG. 11 is a sectional view of a blower unit of FIG. 10. Referring to the drawings, only different parts from the first preferred embodiment will be described.

In the fourth preferred embodiment of the present invention, the air conditioning unit 100 and the distribution unit 200 are arranged in the back-and-forth direction of the vehicle in order, and the blower unit 130 is arranged at one side of the air conditioning unit 100 along the dash panel 300 in the width direction of the vehicle.

That is, only the distribution unit 200 and the air-conditioning case 110 in which an evaporator is embedded are arranged in the back-and-forth direction of the vehicle, and the blower unit 130 is arranged along the dash panel 300 at the left or the right of the air-conditioning case 110.

The blower unit 130 includes: a scroll case 131, which is connected to one side (right side in FIG. 10) of the air-conditioning case 110 of the air conditioning unit 100 and has a blower 132 mounted therein; an intake duct 140, which is arranged on an upper part of the scroll case 131 to communicate with the scroll case 131, and whose one side has an outdoor air inlet 141 and the other side is connected with the indoor air inflow duct 142; and an indoor and outdoor air converting door 135 mounted inside the intake duct 140 to selectively induce indoor air or outdoor air to the scroll case 131.

In the fourth preferred embodiment, because a distance between the blower unit 130 and the dash panel 300 is short, the length of the indoor air inflow duct 142 may be reduced.

Moreover, a penetration part 301 of the dash panel 300 connected with the outlet of the air-conditioning case 110 and an auxiliary penetration part 302 of the dash panel 300 connected with the inlet of the indoor air inflow duct 142 are formed to be spaced apart from each other at a predetermined interval.

Hereinafter, an air flow process of the air conditioning system for the vehicle according to the preferred embodiments of the present invention will be described.

First, the indoor and outdoor air converting door 135 is operated depending on the indoor air inflow mode or the outdoor air inflow mode to open the outdoor air inlet 141 or the indoor air inflow duct 142.

Therefore, when the blower 132 of the blower unit 130 is operated, the outdoor air or the indoor air induced through the outdoor air inlet 141 or the indoor air inflow duct 142 is inhaled to the blower 132 inside the scroll case 131, and then, is blown to the air-conditioning case 110.

The air blown to the air-conditioning case 110 is cooled while passing through the evaporator, and then, flows to the distribution unit 200. After that, the air passes through the heat exchanger for heating 240 by the temperature adjusting door 250 or is adjusted in temperature while being adjusted in the volume of air bypassed.

After that, the air is discharged to the interior of the vehicle through the air outlet opened by the mode door 230 according to the air discharge mode.

In the meantime, the air conditioning system for the vehicle according to the preferred embodiments of the present invention is applicable to all kinds of vehicles, such as general vehicles using internal combustion engines, hybrid vehicles or electric vehicles.

What is claimed is:

1. An air conditioning system for a vehicle comprising:
   an air conditioning unit having a blower unit;
   a distribution unit for distributing air discharged from the air conditioning unit to a specific position in the interior of the vehicle;
   an intake duct disposed above the blower unit in a vertical direction and defining a dead zone between the distribution unit and the intake duct a firewall partitioning an engine room from an interior of the vehicle;
   wherein the air conditioning unit is arranged in the engine room relative to the firewall, and the distribution unit is arranged in the interior of the vehicle relative to the firewall;
   wherein an indoor air inflow duct which connects the blower unit with the interior of the vehicle is arranged and supported on an upper part of an air conditioning case of the air conditioning unit above the air conditioning unit in the vertical direction, in the dead zone between the distribution unit and the intake duct;
   wherein a gap of a predetermined distance is formed between the indoor air inflow duct and the distribution unit;
   the firewall defines an opening at which the air conditioning unit and the distribution unit are combined, and a at which the indoor air inflow duct is fluidly connected to the interior of the vehicle, and wherein the air conditioning case and indoor air inflow duct engage one another at the opening.

2. The air conditioning system according to claim 1, wherein the blower unit includes a blower rotatable about a rotary axis, and wherein the rotary axis is arranged at a right angle relative to a direction at which the indoor air inflow duct extends.

3. The air conditioning system according to claim 2, wherein the blower unit comprises:
   a scroll case which is mounted at an inlet of the air conditioning unit and has the blower arranged therein;
   an intake duct arranged at one side of the scroll case to communicate with the scroll case, the intake duct having a first side defining an outdoor air inlet and a second side connected with the indoor air inflow duct; and
   an indoor and outdoor air converting door mounted inside the intake duct to selectively induce indoor air and outdoor air toward the scroll case.

4. The air conditioning system according to claim 3, wherein the intake duct connects the indoor air inflow duct with the scroll case.

5. The air conditioning system according to claim 3, wherein a filter for removing foreign matters contained in the outdoor air is mounted at the outdoor air inlet.

6. The air conditioning system according to claim 3, wherein a filter for removing foreign matters contained in the indoor air and the outdoor air is mounted between the blower and the indoor and outdoor air converting door.

7. The air conditioning system according to claim 1, wherein a filter for removing foreign matters contained in the indoor air is mounted at an inlet of the indoor air inflow duct.

8. The air conditioning system according to claim 1, wherein the distribution unit comprises:
   an air inlet connected with an outlet of the air conditioning unit;
   a plurality of air outlets for distributing the air induced into the air inlet to specific positions in the interior of the vehicle; and
   mode doors for adjusting the degree of opening of the air outlets.

9. The air conditioning system according to claim 1, wherein the blower unit, the air conditioning unit and the distribution unit are arranged in a back-and-forth direction of the vehicle in order.

10. The air conditioning system according to claim 1, wherein the air conditioning unit and the distribution unit are arranged in a back-and-forth direction of the vehicle in order, and
    wherein the blower unit is arranged at one side of the air conditioning unit along the firewall in a width direction of the vehicle.

11. An air conditioning system for a vehicle comprising:
    an air conditioning unit having a noise-inducing unit, the noise-inducing unit including an evaporator and a blower unit;
    a firewall partitioning an engine room from an interior of the vehicle;
    a distribution unit arranged in the interior of the vehicle for distributing air discharged from the air conditioning unit to a specific position in the interior of the vehicle;
    an intake duct disposed above the blower in a vertical direction and defining a dead zone between the distribution unit and the intake duct;
    the noise-inducing unit positioned in the engine room;
    an evaporator disposed inside the air conditioning unit;
    an indoor air inflow duct for connecting the blower unit with the interior of the vehicle; and
    wherein the indoor air inflow duct is arranged and supported on an upper part of an air conditioning case of the air conditioning unit above the air conditioning unit in the vertical direction, in the dead zone between the distribution unit and the intake duct; and
    wherein a gap of a predetermined distance is formed between the indoor air inflow duct and the distribution unit;

wherein the firewall defines an opening at which the air conditioning unit and the distribution unit are combined, and at which the indoor air inflow duct is fluidly connected to the interior of the vehicle, and wherein the air conditioning unit and indoor air inflow duct engage one another at the opening.

12. An air conditioning system for a vehicle comprising:

a firewall partitioning an engine room from an interior of the vehicle;

an air conditioning case located in the engine room and containing a heat exchanger and a blower unit;

a distribution unit located in the interior of the vehicle for distributing air discharged from the air conditioning case to a specific position in the interior of the vehicle;

an intake duct disposed above the blower unit in a vertical direction and defining a dead zone between the distribution unit and the intake duct;

an indoor air inflow duct connecting the intake duct with the interior of the vehicle for passing air from the interior of the vehicle to the blower unit;

the indoor air inflow duct arranged and supported on an upper part of the air conditioning case above the air conditioning unit in the vertical direction in the dead zone;

a gap defined between the distribution unit and the indoor air inflow duct to allow air from the interior of the vehicle to pass into the indoor air inflow duct; and the firewall defining an opening at which the air conditioning case and the distribution unit are combined, and at which the indoor air inflow duct is fluidly connected to the interior of the vehicle, and wherein the air conditioning case and indoor air inflow duct engage one another at the opening.

13. The air conditioning system as set forth in claim 1 further including an evaporator located in the air conditioning unit and a heat exchanger for heating located in the distribution unit.

14. The air conditioning system as set forth in claim 1 wherein the intake duct defines an outdoor air inlet at a top surface, and wherein the indoor air inflow duct extends generally perpendicularly to the outdoor air inlet.

15. The air conditioning system as set forth in claim 14 wherein the indoor and outdoor air converting door is located in the intake duct and moveable to selectively provide indoor air from the air inflow duct and outdoor air from the outdoor air inlet to the blower unit.

16. The air conditioning system as set forth in claim 15 wherein the blower unit includes a blower rotatable about a rotary axis, wherein the outdoor air inlet is aligned with the rotary axis, and wherein the indoor air inflow duct extends perpendicularly to the rotary axis.

17. The air conditioning system as set forth in claim 1, wherein the firewall does not extend between the air conditioning case and the indoor air inflow duct.

18. The air conditioning system as set forth in claim 11, wherein the firewall does not extend between the air conditioning case and the indoor air inflow duct.

19. The air conditioning system as set forth in claim 1, wherein the air inflow duct extends in a direction parallel to the air conditioning case such that air passing through the air inflow duct passes in a same direction as air passing through the air conditioning case.

20. The air conditioning system as set forth in claim 11, wherein the air inflow duct extends in a direction parallel to the air conditioning case such that air passing through the air inflow duct passes in a same direction as air passing through the air conditioning case.

* * * * *